UNITED STATES PATENT OFFICE.

GEORGE WHITNEY, OF PHILADELPHIA, PENNSYLVANIA.

IMPROVEMENT IN MELTING IRON AND STEEL SHAVINGS, TURNINGS, &c.

Specification forming part of Letters Patent No. 132,743, dated November 5, 1872.

*To all whom it may concern:*

Be it known that I, GEORGE WHITNEY, of the city and county of Philadelphia, in the State of Pennsylvania, have invented a certain new and useful improvement in the art of melting and of working dust, shavings, borings, turnings, and other small pieces and scraps of iron and steel, of which improvement the following is a specification:

The best method heretofore used in the art for melting cast-iron dust, shavings, borings, turnings, &c., has consisted in confining them in a cast-iron retaining-vessel with one or more perforations through it, and melting the vessel, together with its contents, in a cupola or other furnace, the operation being that as the vessel descends in the furnace its contents are partially fused and pasted together before the vessel melts, and by the time the melting-point is reached (at about the tuyeres) the vessel and its contents melt together with but small loss of metal. The objection to this method is that the making and melting of the iron retaining-vessels is too expensive.

It is the object of my invention to melt or work dust, shavings, borings, turnings, and other small pieces and scraps of iron and steel by a simple, effective, and economical method, and at the same time to attain an improved product; and to these ends my improvement consists in inclosing the dust, shavings, &c., above mentioned in boxes, casings, or envelopes of wood or other equivalent carbonizable material, and charging these packages into a cupola or other furnace for melting, or into a puddling or other furnace for working in the usual ways, respectively.

The operation in the furnace for melting is that the boxes and their contents (as with the cast-iron retaining-vessels) are subjected to the gradually increasing heat as they descend in the furnace. The wood of the box becoming charred into charcoal (for want of sufficient oxygen to produce complete combustion) and the contents becoming partially fused and pasted together, so that when the melting-point is reached about at the tuyeres the oxygen there admitted produces combustion of the boxes and the contents melt with but small loss of metal.

The operation in the puddling or other furnace for working is similar to that in the furnace for melting, except that the process is not carried to the melting-point. The boxes and their contents are charged into the furnace at the usual place, where the lack of oxygen (as in the melting-furnace) causes the heat gradually to char the boxes into charcoal, and at the same time to partially fuse and paste the contents together, in which state the mass of metal is separated from the charcoal by the workmen and formed into balls in the ordinary manner of working metal in puddling or other furnaces.

For melting, the contents of the boxes may be entirely of cast-iron; or a mixture of cast-iron and wrought-iron; or of cast-iron and steel; or of cast-iron, wrought-iron, and steel; but when the contents are of either of the mixtures named I prefer that the proportion of cast-iron should preponderate, as and for the purpose described in Letters Patent No. 129,261 granted to me for improvement in metals for castings, under date of July 16, 1872.

For working, in the puddling or other furnace, the contents of the boxes may be entirely of cast-iron, or entirely of wrought-iron, or of a mixture of cast and wrought-iron in any desired proportion; but in order to work steel it should be mixed with at least an equal weight of cast-iron.

In practicing my invention I use rough boxes, very cheaply constructed of pine boards nailed together, not open at the top, but inclosing the contents on all sides. The dimensions of the boxes inside are about ten inches square, and the weight of the contents of each is about one hundred pounds. The boxes may have cracks or other small openings at the joints or elsewhere, it being necessary only to make them tight enough to prevent the contents from falling out, and the openings allow the heat more easily to penetrate and act upon the contents to partially fuse and paste them together. For many years before my invention I used the cast-iron retaining-vessels herein mentioned for melting cast-iron dust, shavings, &c., but I have obtained by the use of the boxes of wood described results in the quantity of melted metal as great as, if not greater, than by the use of the cast-iron retaining-vessels, while the economy is very greatly in favor of the boxes of wood, and there is a decided superiority in the quality of the metal produced by their use, owing to the charcoal of the box in a measure recarbonizing the contents.

I do not mean to limit myself to any mixture of the contents of the boxes, nor to any particular size or shape thereof, or manner of fastening them together, though I have stated what I deem the best rules in these respects. Neither do I confine myself to the use of wood only for the material of which the boxes shall be composed, as the gist of my invention consists in using carbonizable material substantially in the manner and for the purposes described, whether for the whole or part of the boxes, casings, or envelopes which contain the dust, shavings, &c., of iron and steel, as above mentioned; and I therefore claim as my invention, and desire to secure by Letters Patent—

The improvement in the art of melting and working dust, shavings, borings, turnings, and other small pieces and scraps of iron and steel hereinbefore set forth, by inclosing them in carbonizable boxes, casings, or envelopes, and charging such packages into the furnace.

GEO. WHITNEY.

Witnesses:
JAMES S. WHITNEY,
GEO. H. KIRK.